United States Patent
Hwang et al.

(10) Patent No.: US 12,356,442 B2
(45) Date of Patent: Jul. 8, 2025

(54) METHOD AND DEVICE FOR MEASURING SIDELINK CHANNEL IN WIRELESS COMMUNICATION SYSTEM

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 17/436,219

(22) PCT Filed: Mar. 4, 2020

(86) PCT No.: PCT/KR2020/003043
§ 371 (c)(1),
(2) Date: Sep. 3, 2021

(87) PCT Pub. No.: WO2020/180099
PCT Pub. Date: Sep. 10, 2020

(65) Prior Publication Data
US 2022/0132516 A1 Apr. 28, 2022

Related U.S. Application Data

(60) Provisional application No. 62/937,243, filed on Nov. 18, 2019.

(30) Foreign Application Priority Data

Mar. 4, 2019 (KR) ........................ 10-2019-0024824

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0051* (2013.01); *H04W 72/02* (2013.01);
(Continued)

(58) Field of Classification Search
CPC . H04W 72/542; H04W 72/20; H04W 72/563; H04W 72/02; H04W 72/0453; H04W 72/1263
See application file for complete search history.

(56) References Cited

FOREIGN PATENT DOCUMENTS

| KR | 20120017410 | 2/2012 |
|---|---|---|
| WO | WO2017010767 | 1/2017 |

(Continued)

OTHER PUBLICATIONS

Huawei, HiSilicon, "Sidelink physical layer structure for NR V2X," R1-1901536, Presented at 3GPP TSG RAN WG1 Meeting #96, Athens, Greece, Feb. 25-Mar. 1, 2019, 12 pages.

(Continued)

*Primary Examiner* — Rhonda L Murphy
(74) *Attorney, Agent, or Firm* — Fish & Richardson P.C.

(57) ABSTRACT

Proposed is a method for performing wireless communication by a first device. The method may comprise a step of receiving a channel state information reference signal (CSI-RS) through a physical sidelink shared channel (PSSCH) from a second device, measuring a channel state through the CSI-RS on the basis of a reference type associated with the PSSCH, and transmitting information about the channel state to the second device. For example, the reference type associated with the PSSCH may be determined on the basis of whether a slot including a resource associated with the PSSCH includes a resource associated with a physical sidelink feedback channel (PSFCH).

14 Claims, 21 Drawing Sheets

(51) Int. Cl.
  *H04W 72/02*     (2009.01)
  *H04W 72/0453*   (2023.01)
  *H04W 72/1263*   (2023.01)
  *H04W 72/20*     (2023.01)
  *H04W 72/563*    (2023.01)

(52) U.S. Cl.
  CPC ... *H04W 72/0453* (2013.01); *H04W 72/1263* (2013.01); *H04W 72/20* (2023.01); *H04W 72/563* (2023.01)

(56) References Cited

FOREIGN PATENT DOCUMENTS

| WO | WO2017176098 | 10/2017 | | |
|---|---|---|---|---|
| WO | WO-2020177027 A1 | * | 9/2020 | ........ H04W 72/0446 |

OTHER PUBLICATIONS

Samsung, "Considerations on Sidelink CSI," R1-1902279, Presented at 3GPP TSG RAN WG1 #96, Athens, Greece, Feb. 25-Mar. 1, 2019, 6 pages.

\* cited by examiner

FIG. 4
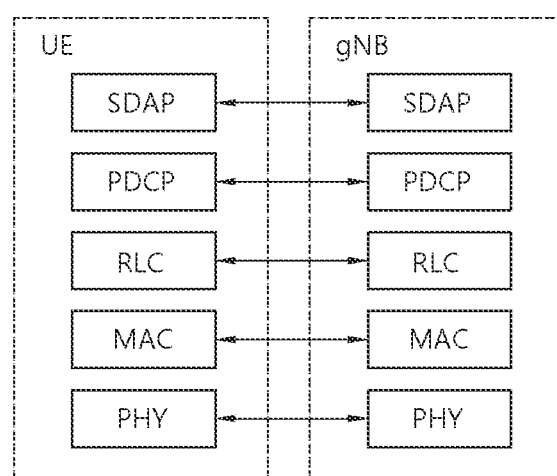
(a)
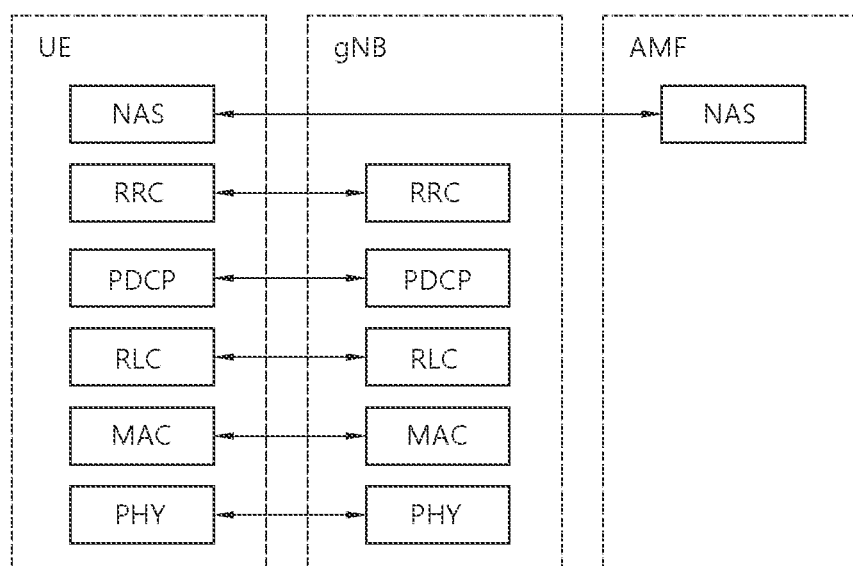
(b)

FIG. 8
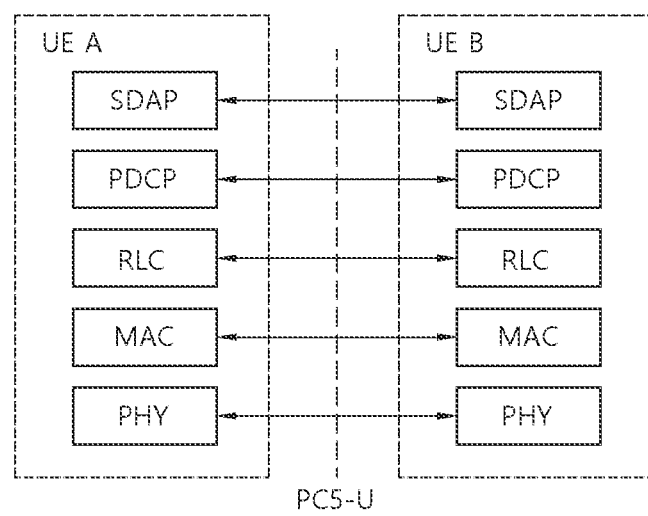
(a)
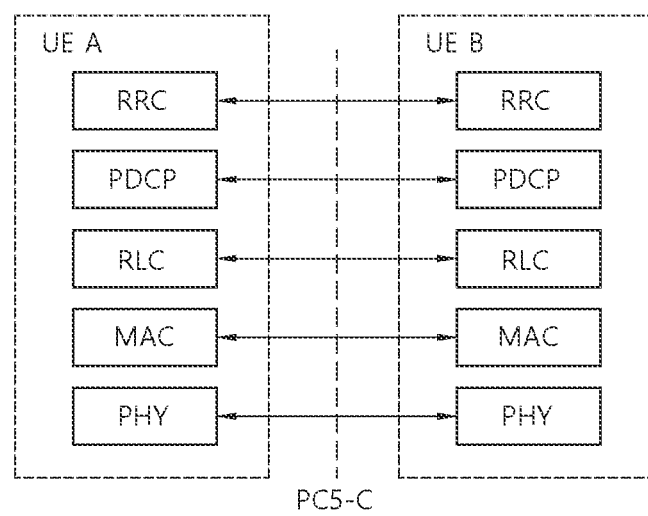
(b)

METHOD AND DEVICE FOR MEASURING SIDELINK CHANNEL IN WIRELESS COMMUNICATION SYSTEM

CROSS-REFERENCE TO RELATED APPLICATIONS

This application is a National Stage application under 35 U.S.C. § 371 of International Application No. PCT/KR2020/003043, filed on Mar. 4, 2020, which claims the benefit of Korean Patent Application No. 10-2019-0024824, filed on Mar. 4, 2019 and U.S. Provisional Application No. 62/937,243, filed on Nov. 18, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, resource mapping pattern information for a demodulation reference signal (DMRS) and/or information related to DMRS mapping density may be flexibly changed through an SCI indication transmitted from a transmitting UE to a receiving UE. In addition, for example, when the transmitting UE transmits two stage SCI to the receiving UE through the PSCCH, the overhead for the second stage SCI may be variable, accordingly, the amount of data and/or the coding rate that can be transmitted by the transmitting UE to the receiving UE through the PSSCH may change. At this time, when the understanding of the PSCCH/PSSCH transmission method is different between the sidelink CSI-RS transmitting UE and the sidelink CSI-RS receiving UE, the CSI report of a sidelink CSI-RS receiving UE and/or sidelink CSI-RS transmission CSI utilization of a sidelink CSI-RS transmitting UE may be inefficient. Therefore, in order to efficiently utilize CSI between the sidelink CSI-RS transmitting UE and the sidelink CSI-RS receiving UE, a reference form for PSCCH/PSSCH transmission may be required.

Technical Solutions

In an embodiment, there is provided a method of performing wireless communication by a first apparatus 100. The method may include receiving a channel state information reference signal (CSI-RS) through a physical sidelink shared channel (PSSCH) from a second device, and measuring a channel state through the CSI-RS based on a reference form related to the PSSCH, and transmitting information on the channel state to the second device. For example, the reference type related to the PSSCH is determined based on that a slot including resources related to the PSSCH does not include resources related to a physical sidelink feedback channel (PSFCH).

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
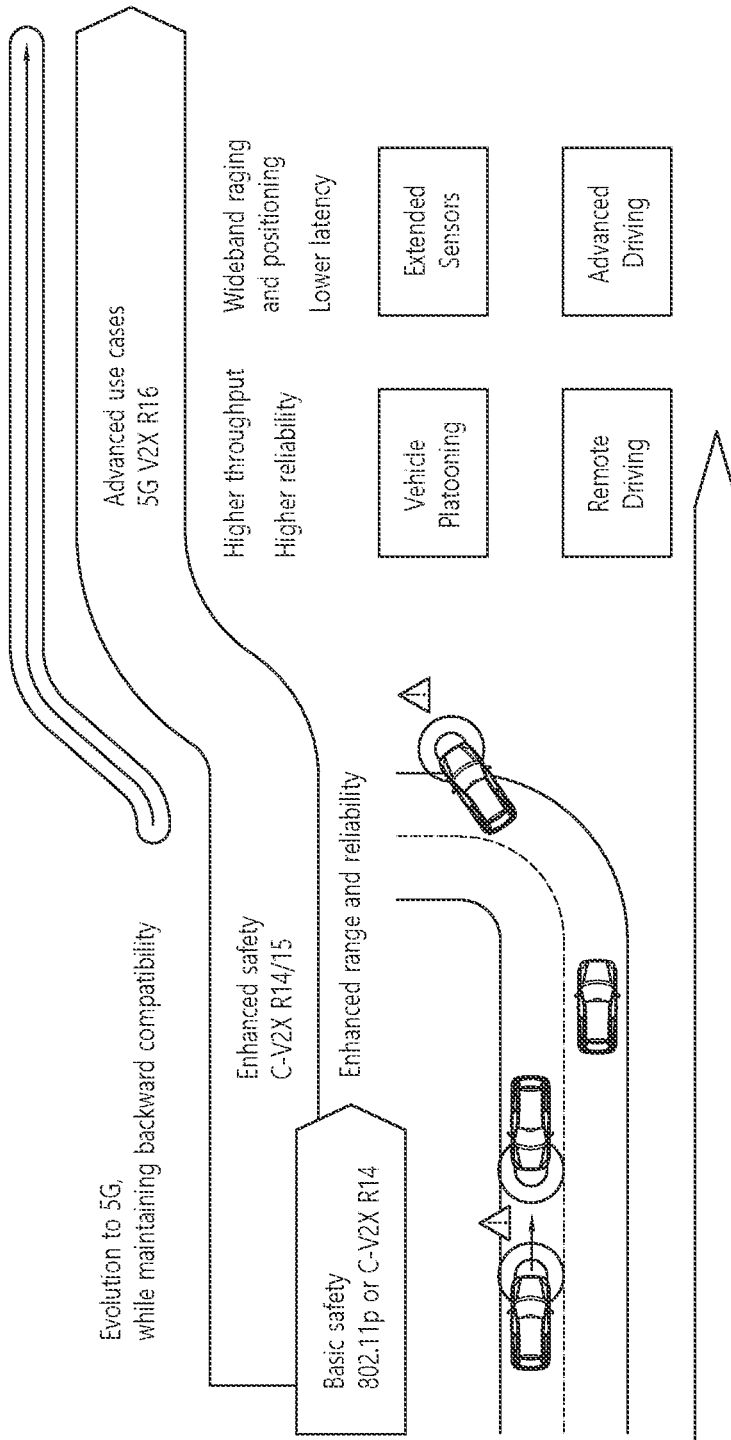
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
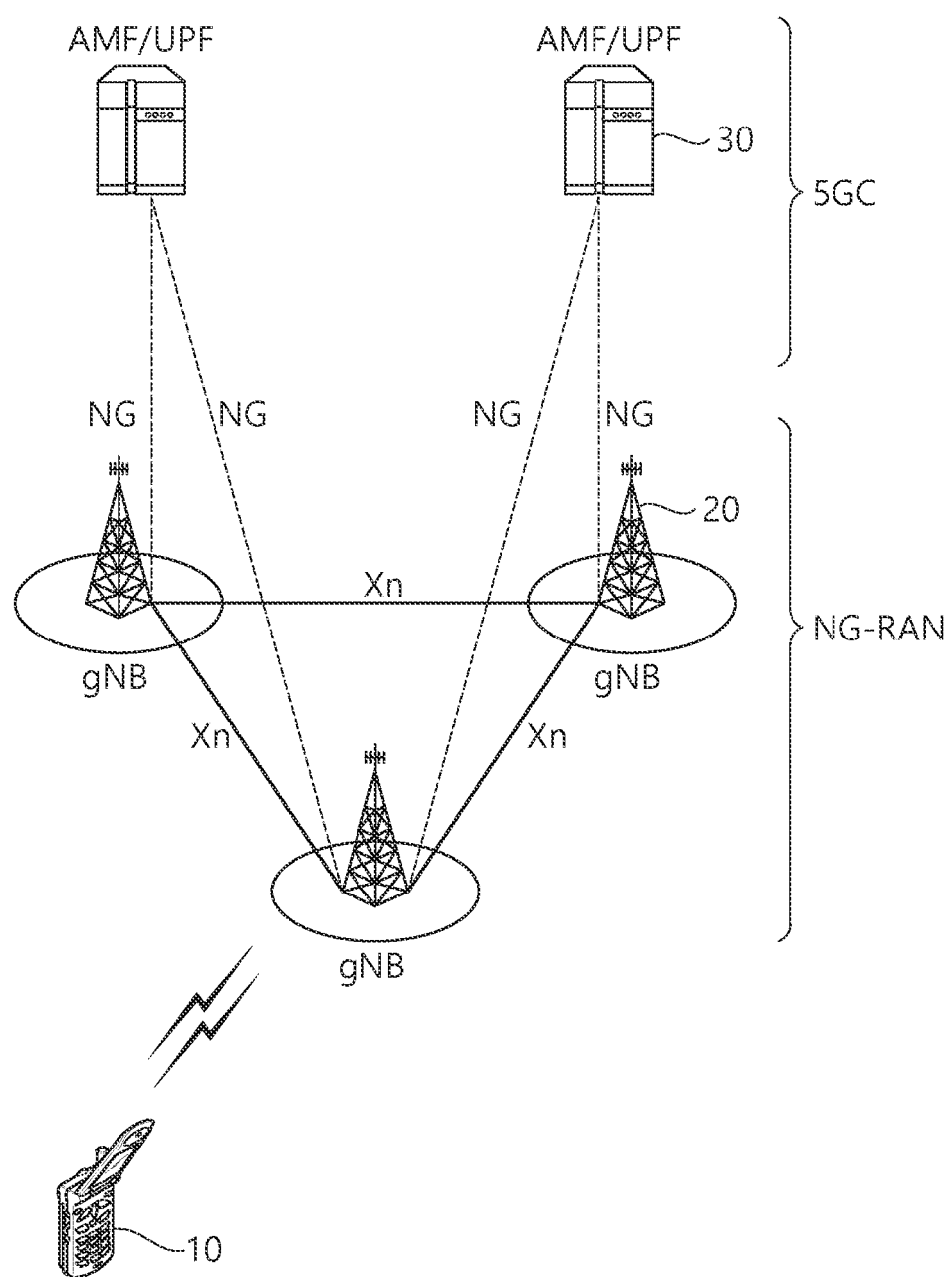
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
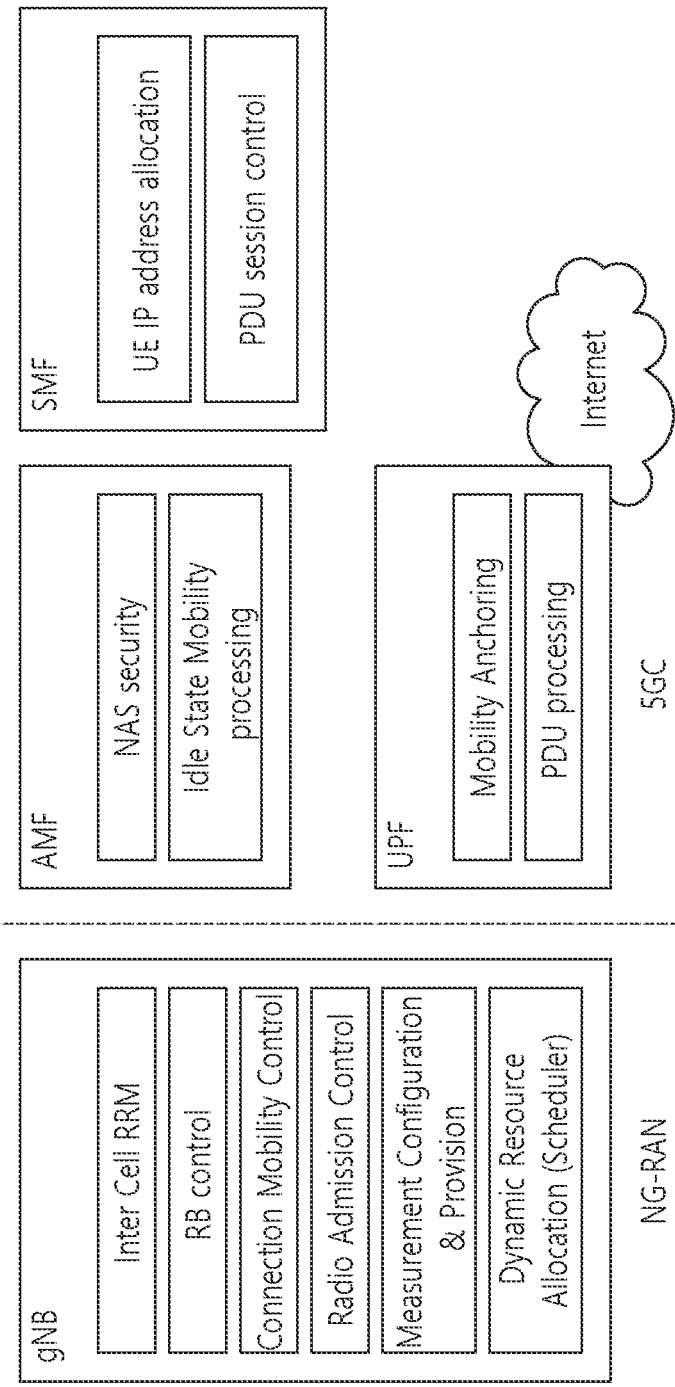
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
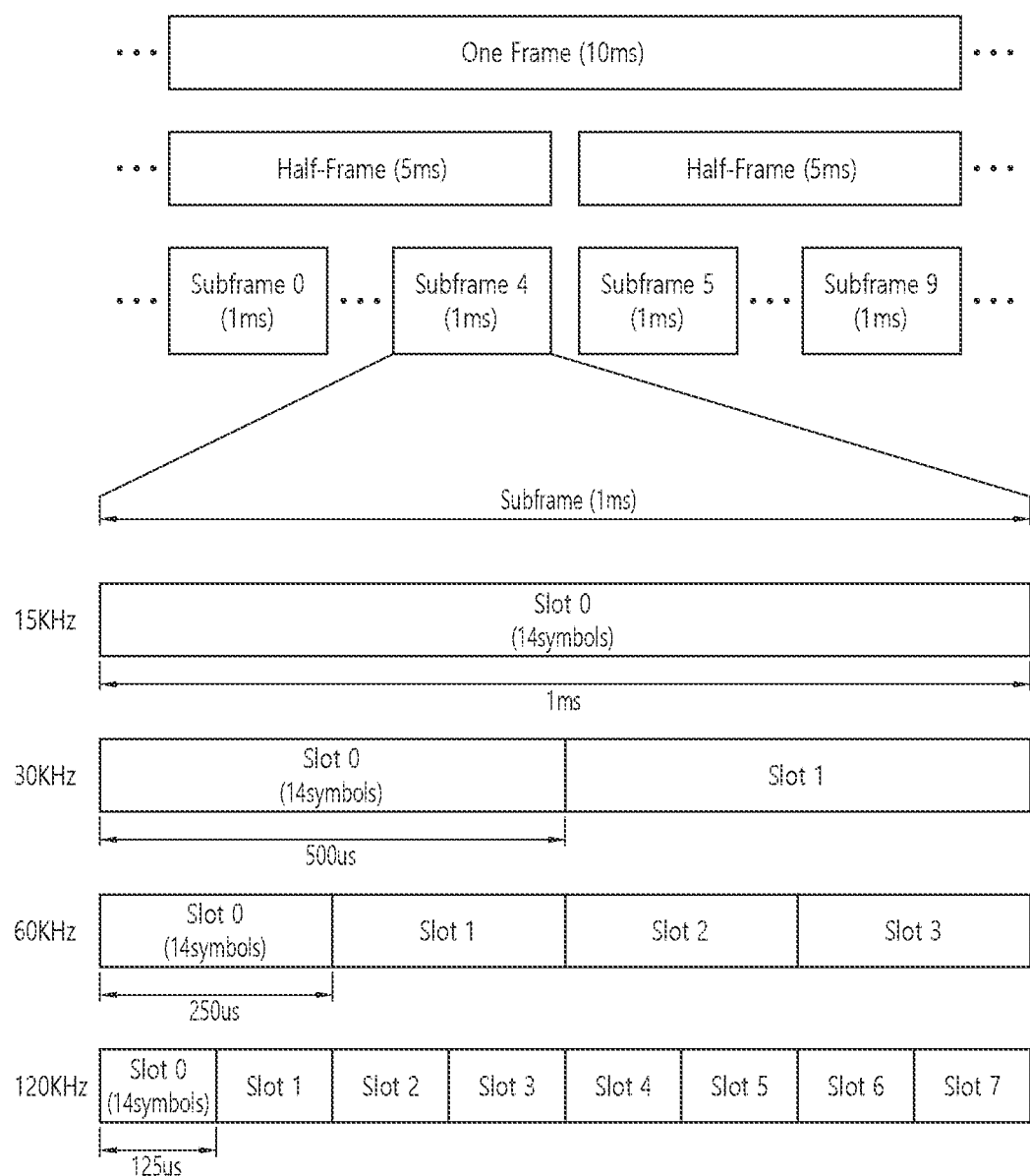
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
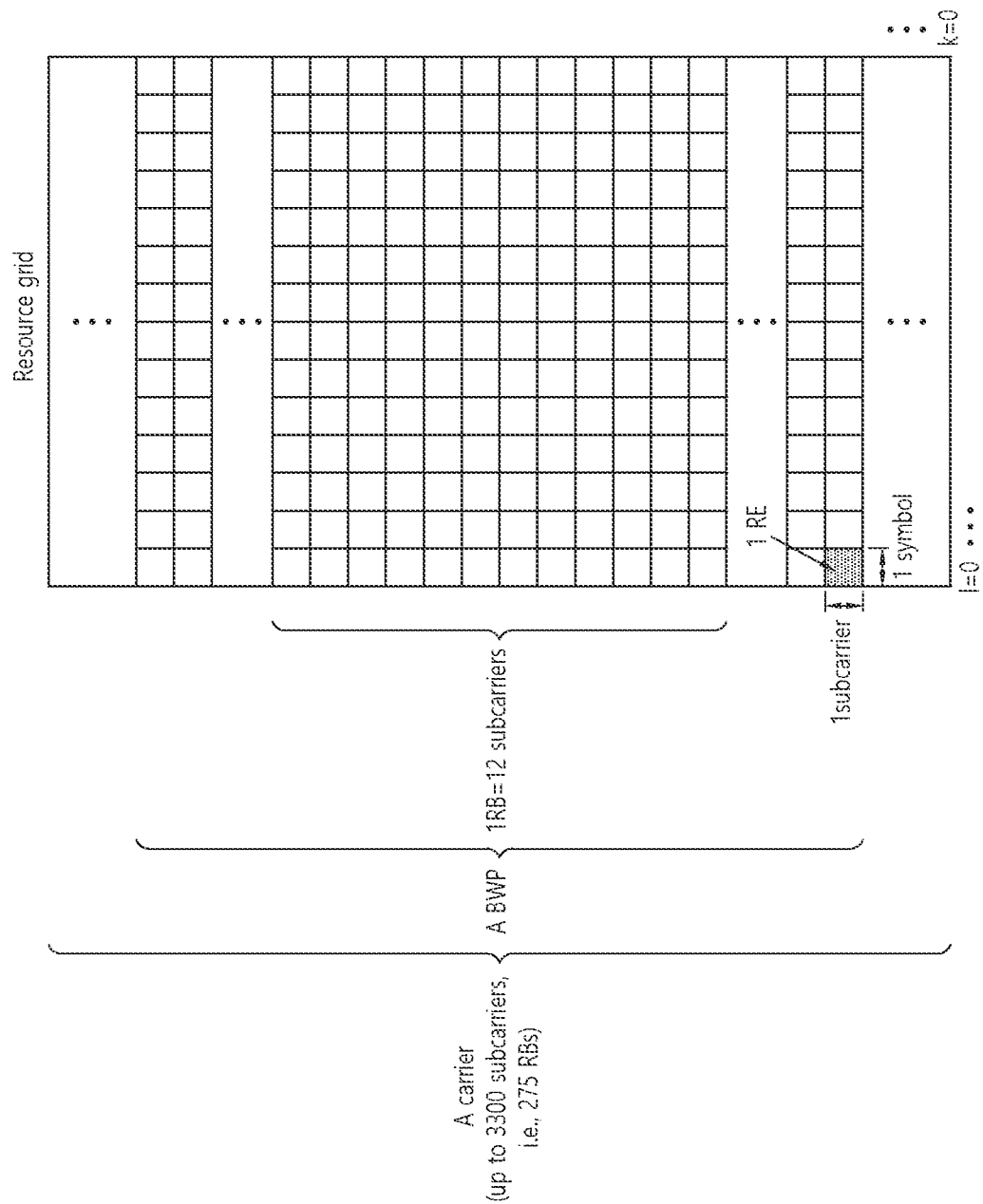
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
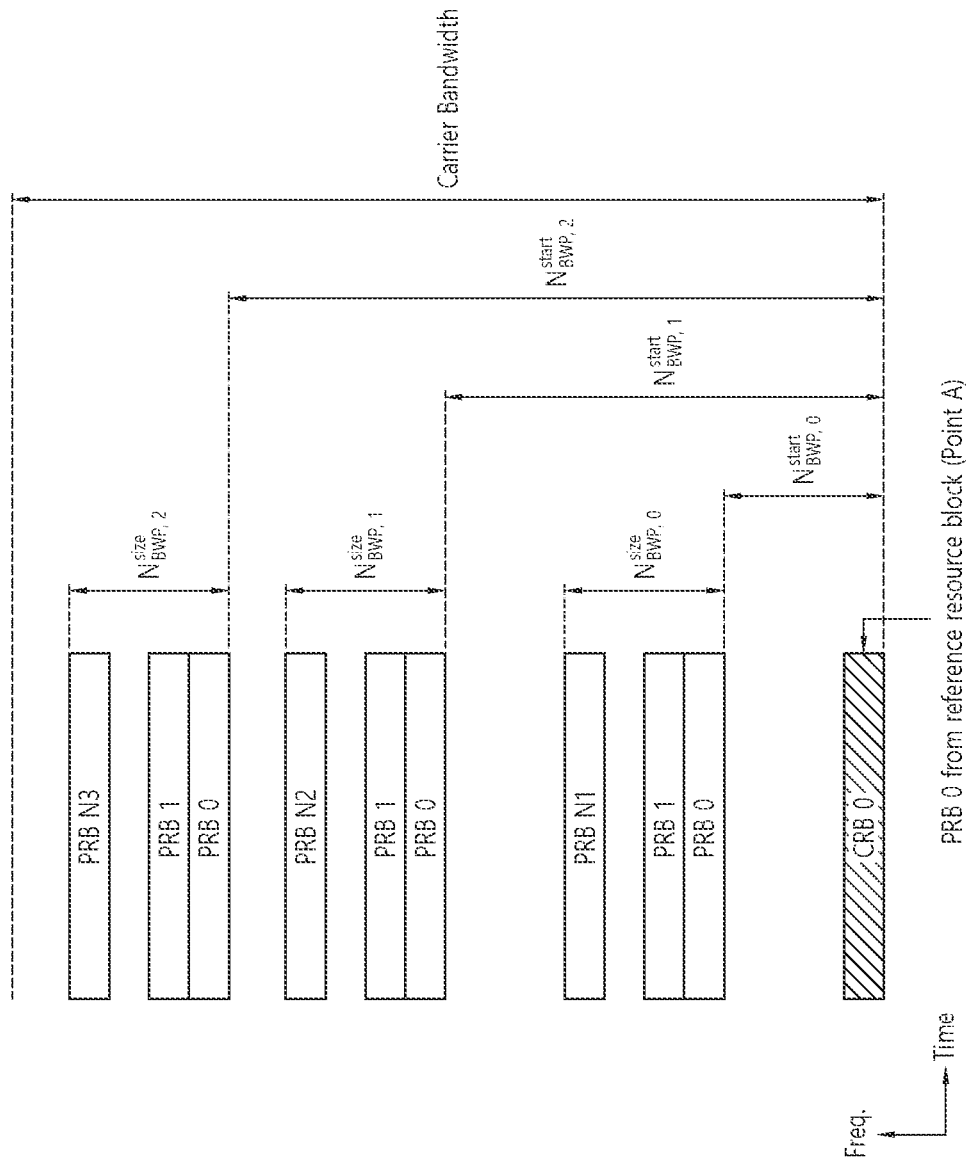
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
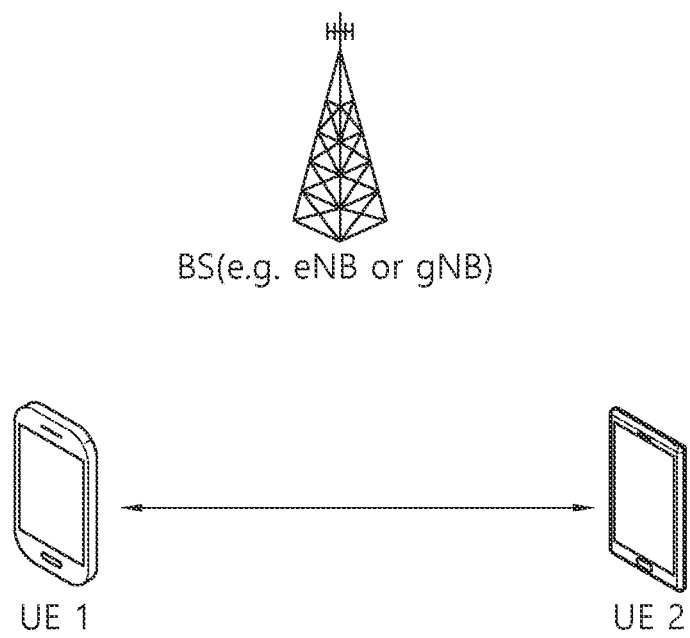
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
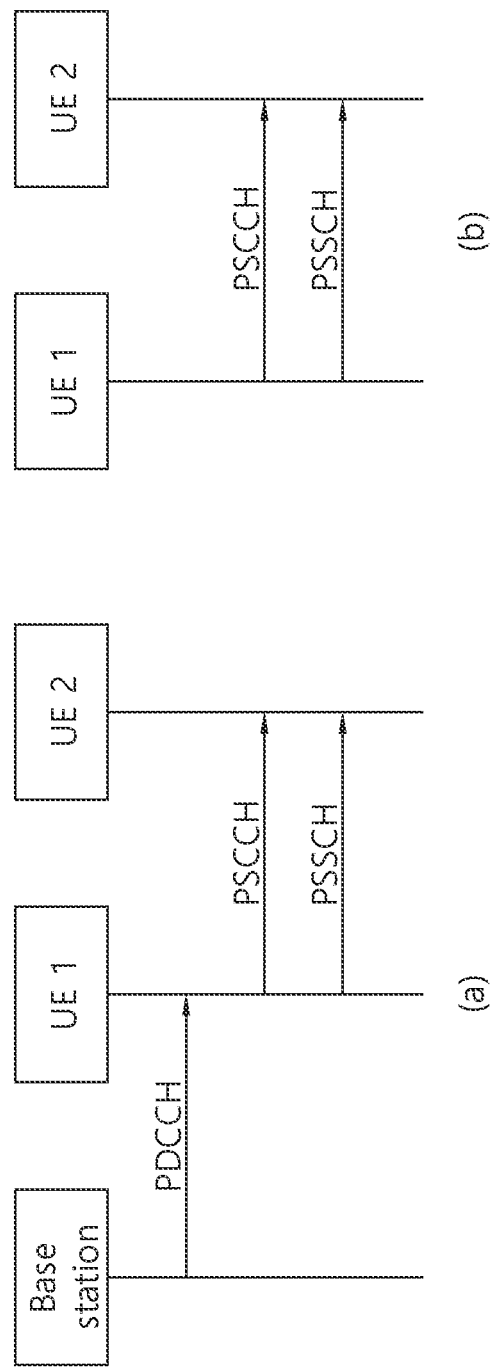
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
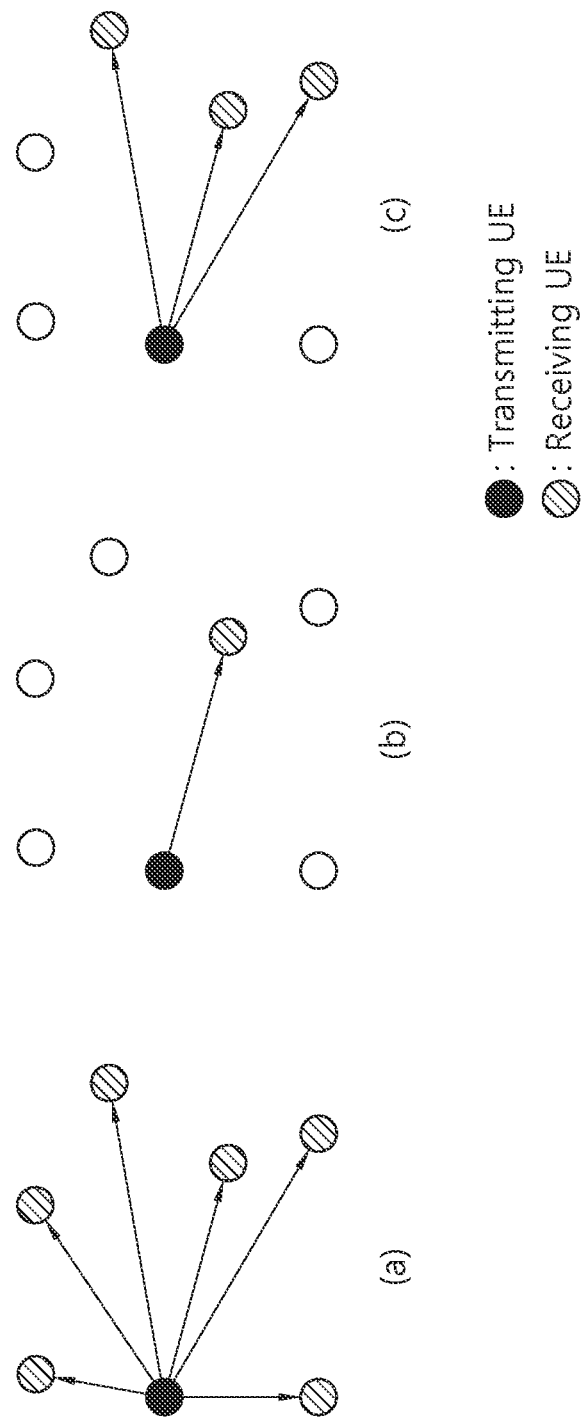
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can transmit and receive information as a communication terminal, select resources for communication with or without the base station's help depending on the situation, and send and receive messages between terminals.

Hereinafter, SL measurement and reporting will be described.

For the purpose of QoS prediction, initial transmission parameter setting, link adaptation, link management, admission control, etc., sidelink (SL) measurement and reporting between UEs (e.g., For example, RSRP (Reference Signal Received Power) and RSRQ (Reference Signal Received Quality)) may be considered in the SL. For example, the receiving UE may receive a reference signal from the transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR, and reporting of location information. Examples of CSI (Channel Status Information) for V2X may be CQI (Channel Quality Indicator), PMI (Precoding Matrix Index), RI (Rank Indicator), RSRP, RSRQ, path-gain/path-loss, SRI (SRS, Sounding Reference Symbols, Resource Indicator), CRI (CSI-RS Resource Indicator), interference condition, vehicle motion, and the like. For unicast communication, CQI, RI, and PMI or some of them may be supported in a non-subband-based aperiodic CSI report assuming four or less antenna ports. The CSI procedure may not depend on a standalone RS. CSI reporting may be activated and deactivated according to settings.

For example, the transmitting UE may transmit a CSI-RS to the receiving UE, and the receiving UE may measure CQI or RI by using the CSI-RS. For example, the CSI-RS may be referred to as an SL CSI-RS. For example, the CSI-RS may be confined within PSSCH transmission. For example, the transmitting UE may transmit the CSI-RS to the receiving UE by including the CSI-RS on the PSSCH resource.

For the purpose of QoS prediction, initial transmission parameter setting, link adaptation, link management, admission control, etc., SL measurement and reporting between UEs (e.g., For example, RSRP (Reference Signal Received Power) and RSRQ (Reference Signal Received Quality)) may be considered in the SL. In this case, in order to maintain the accuracy of the SL measurement above a certain level, an UE transmitting a reference signal (RS) (hereinafter, a RS transmitting UE) needs to guarantee the number/frequency of RS transmission to a certain level or more during a pre-configured time period. In addition, in order to maintain the accuracy of the SL measurement above a certain level, the RS transmitting UE needs to keep the RS transmission power constant.

However, for example, when the RS transmitting UE cannot keep the RS transmission power constant for a specific period, the RS receiving UE may not be able to accurately measure the channel state between the RS receiving UE and the RS transmitting UE. That is, the RS receiving UE for measuring the sidelink channel state needs to know the transmission power of the RS in order to accurately measure the channel state. For example, when the RS transmitting UE cannot keep the RS transmission power constant for a specific period, the RS receiving UE may not be able to accurately measure the channel state between itself and the RS transmitting UE during the specific period. Therefore, even when the RS transmitting UE cannot keep the RS transmission power constant, a method for enabling the RS receiving UE to accurately measure a sidelink channel state needs to be proposed. In this specification, the RS for measuring the sidelink channel state may be called by various names such as a Measurement Reference Signal (M-RS), a sidelink measurement RS, an SL measurement RS, a measurement RS, and a CSI-RS. Hereinafter, a method for measuring an RS-based sidelink channel and an apparatus supporting the same according to an embodiment of the present disclosure will be described.

Figure 12:
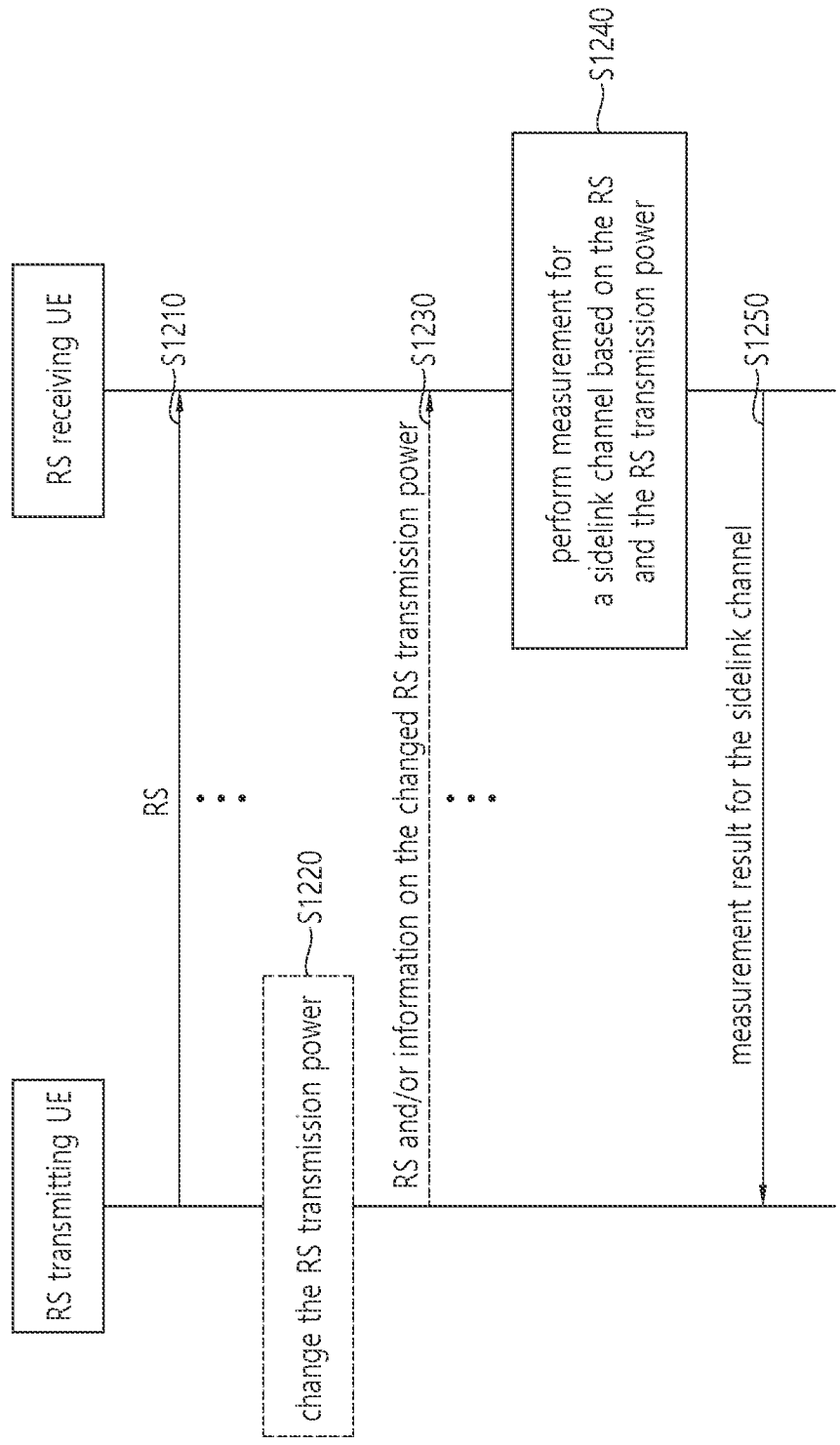
FIG. 12 shows an RS-based sidelink channel measurement procedure in accordance with an embodiment of the present disclosure.

FIG. 12 shows an RS-based sidelink channel measurement procedure in accordance with an embodiment of the present disclosure.

Referring to FIG. 12, in step S1210, the RS transmitting UE may transmit a RS to the RS receiving UE. For example, the RS may be a reference signal used by the RS receiving UE to measure a sidelink channel state between the RS receiving UE and the RS transmitting UE. For example, the RS may be mapped on a time domain and/or a frequency domain and transmitted to the RS receiving UE according to the following mapping rule.

(1) Mapping Rules in Time Domain

For example, the RS may be mapped on the time domain based on a mapping rule in the time domain and transmitted to the RS receiving UE. For example, the RS transmitting UE may map the RS based on a mapping rule in the time domain and transmit the RS to the RS receiving UE. For example, considering that the RS is transmitted simultaneously with a PSCCH and/or a PSSCH, the RS may be related with a starting part of the PSCCH and/or the PSSCH. Alternatively, for example, considering that the RS is transmitted simultaneously with a PSCCH and/or a PSSCH, the RS may be related with an end part of the PSCCH and/or the PSSCH. In particular, for example, in the case of the PSSCH, considering that a symbol duration and/or a symbol position is different for each slot, the RS may be related with a starting part of the PSCCH and/or the PSSCH or an end part of the PSCCH and/or the PSSCH. For example, a start symbol of the RS may be configured after a specific symbol offset from the start symbol of the PSSCH. For example, a start symbol of the RS may be configured before a specific symbol offset from the start symbol of the PSSCH. For example, the position of the RS may be different or independent according to a DMRS configuration/position/density of the PSCCH and/or the PSSCH. For example, the RS transmitting UE may map a start symbol of the RS before a specific symbol offset from a start symbol of the PSCCH and/or the PSSCH. For example, the RS transmitting UE may map a start symbol of the RS after a specific symbol offset from a start symbol of the PSCCH and/or the PSSCH. Through this, it is possible to prevent the RS from overlapping with the DMRS. For example, considering a transient period or automatic gain control (AGC), it may not be suitable for the RS to be TDMed exclusively with other channels/signals. In this case, a power control of another UE may be difficult.

(2) Mapping Rules in the Frequency Domain

For example, the RS may be mapped on the frequency domain based on a mapping rule in the frequency domain and transmitted to the RS receiving UE. For example, the RS transmitting UE may map the RS based on a mapping rule in the frequency domain and transmit the RS to the RS receiving UE. For example, in order to measure wideband channel state information (CSI), the RS may be configured independently of the frequency domain of a PSCCH or a PSSCH. In this case, for example, the RS receiving UE may measure a channel state for a wider area based on the RS. For example, an RS configured independently of the frequency domain of a PSCCH or a PSSCH may be referred to as a wideband RS.

Alternatively, for example, the RS may be configured within the frequency domain of a PSCCH or a PSSCH. This is because when the RS is transmitted at the Resource Element (RE) level in another area, an In-Band Emission (IBE) issue may occur. For example, an RS configured in the frequency domain of the PSCCH or the PSSCH may be referred to as a narrowband RS.

In the case of the narrowband RS, the UE may operate as follows. For example, when the UE intends to measure wideband CSI, the UE may calculate CSI by aggregating narrowband RSs located at different locations. On the other hand, when the UE intends to measure narrowband CSI, the UE may calculate CSI by aggregating narrowband RSs located in the same/similar position.

In the case of the narrowband RS, the RS may be strictly selected with respect to a start RB and an end RB. For example, when the PSSCH is transmitted in RB #3 to RB #7, the RS for channel measurement may also be transmitted in RB #3 to RB #7. Alternatively, for example, in the case of a narrowband RS, the RS may be transmitted in units of subbands. For example, the RS transmitting UE may strictly select a start RB and an end RB. For example, when the RS transmitting UE transmits a PSSCH in RB #3 to RB #7, the RS transmitting UE may transmit a RS for channel measurement in RB #3 to RB #7. For example, when a part of a subband is truncated, the RS may not be transmitted in the corresponding subband. For example, When the PSSCH is transmitted in RB #3 to RB #7, if the subband starts at an even RB index, a RS for channel measurement may be transmitted in RB #4 to RB #6. For example, When the RS transmitting UE transmits the PSSCH in RB #3 to RB #7, if the subband starts at an even RB index, the RS transmitting UE may transmit a RS for channel measurement in RB #4 to RB #6.

Meanwhile, for example, when the RS receiving UE does not know the RS transmission power of the RS transmitting UE, since the RS receiving UE does not have a good channel state, the RS receiving UE may not be able to distinguish whether the RS reception power is weak or whether the RS transmission power is initially weak.

Therefore, in order to solve the above-described problem, it can be assumed that the RS transmission power is fixed. For example, the RS transmitting UE may keep the RS transmission power the same for a specific time period. Alternatively, for example, the RS transmitting UE may maintain the same power spectral density for each resource element during a specific time period. For example, if the RS transmitting UE is configured to maintain the same RS transmission power, the RS transmitting UE may keep the RS transmission power the same for a specific time period. For example, the RS transmitting UE may receive configuration information for the RS transmitting UE from the base station or from another UE. In addition, for example, the RS transmitting UE may need to inform the RS receiving UE of the RS transmission power. For example, information related to the RS transmission power may be exchanged between UEs through pre-defined signaling. For example, when negotiation is performed between UEs, transmission power for the RS may be configured for the UEs.

Alternatively, it may be assumed that the RS transmission power is changed according to circumstances. For example, there may be a case in which the RS transmitting UE cannot transmit the RS with a pre-defined transmission power. For example, when the RS transmitting UE needs to simultaneously perform Uu transmission (i.e., communication between the base station and the UE) on another carrier configured to a relatively high priority at the time of transmitting the RS, the RS transmitting UE may not be able to transmit RS with a pre-defined transmission power. For example, when the RS transmitting UE cannot transmit the RS with a pre-defined transmission power, the RS transmitting UE may drop the RS transmission. For example, when the power of a specific resource element for a PSCCH or a PSSCH for the RS transmission is reduced below a certain level, the RS transmitting UE may drop the RS. For example, if the RS transmission power is reduced by more than a pre-determined threshold, the RS transmitting UE may drop the RS. For example, when a ratio of the RS transmission power is reduced by more than a pre-determined threshold, the RS transmitting UE may drop the RS. For example, when the energy per resource element (EPRE) for a PSSCH is reduced by more than a pre-determined threshold value, the RS transmitting UE may drop the RS. For example, if a ratio of EPRE for a PSSCH is reduced by more than a pre-determined threshold, the RS transmitting UE may drop the RS. In this case, the RS receiving UE may not expect the RS transmitting UE to trigger transmission of the RS. For example, the ratio of the EPRE to the PSSCH may be defined as in Equation 1 or Equation 2.

$$\text{a ratio of } EPRE \text{ for } PSSCH = \frac{PSSCH\ EPRE\ \text{before REDUTION}}{PSSCH\ EPRE\ \text{after REDUTION}} \quad \text{[Equation 1]}$$

$$\text{a ratio of } EPRE \text{ for } PSSCH = \frac{PSSCH\ EPRE\ \text{after REDUTION}}{PSSCH\ EPRE\ \text{before REDUTION}} \quad \text{[Equation 2]}$$

Alternatively, for example, when the RS transmitting UE fails to transmit the RS with a pre-defined transmission power, in step S1220, the RS transmitting UE may change the RS transmission power. For example, when the power of a specific resource element for a PSCCH or a PSSCH for the RS transmission is reduced below a certain level, the RS transmitting UE may change the RS transmission power.

Specifically, when the RS transmitting UE fails to transmit the RS with a pre-defined transmission power, the RS transmitting UE may determine whether to drop the RS transmission or change the RS transmission power to transmit. For example, when the RS transmission power of the RS transmitting UE is reduced less than a threshold value or less than or equal to a threshold value, the RS transmitting UE may drop the RS transmission. On the other hand, although the RS transmitting UE cannot transmit the RS with a pre-defined transmission power, if the RS transmission power of the RS transmitting UE is not reduced less than a threshold value or less than or equal to a threshold value, in step S1220, the RS transmitting UE may change the RS transmission power. For example, if the EPRE for the PSCCH or the PSSCH is reduced less than a threshold value or less than or equal to a threshold value, the RS transmitting UE may drop the RS transmission. On the other hand, although the RS transmitting UE cannot transmit the RS with a pre-defined transmission power, if the EPRE for the PSCCH or the PSSCH is not reduced less than a threshold value or less than or equal to a threshold value, in step S1220, the RS transmitting UE may change the RS transmission power. The threshold value may be configured by the UE. For example, the threshold value may be pre-configured for the UE by the base station.

In step S1230, the RS transmitting UE may transmit information on the changed RS transmission power to the RS receiving UE. For example, the information on the changed RS transmission power may be a changed RS transmission power value. For example, the information on the changed RS transmission power may be information indicating that the RS transmission power has been changed.

Specifically, for example, the RS transmitting UE may transmit information on the RS transmission power to the RS receiving UE through a channel in which the RS is to be embedded. For example, the information on the RS transmission power may be piggybacked on the PSSCH. Therefore, when the RS receiving UE receives the PSSCH to which information on the RS transmission power is piggy-backed, the RS receiving UE may know the RS transmission power for the RS. For example, for the information on the RS transmission power, joint coding may be performed on data transmitted by the RS transmitting UE. Therefore, when the RS receiving UE receives data being joint coded with the information on the RS transmission power, the RS receiving UE may know the RS transmission power for the RS. For example, the RS transmission power may be informed to the RS receiving UE by an SCI indication. Therefore, when the RS receiving UE receives the SCI including information on the RS transmission power, the RS receiving UE may know the RS transmission power for the RS.

Alternatively, for example, the RS transmitting UE may include information on RS transmission power in the RS. For example, the RS transmitting UE may transmit an RS including information on the RS transmission power to the RS receiving UE. For example, an RS sequence may be configured differently for each RS transmission power. In this case, when the RS receiving UE receives a specific RS sequence, the RS receiving UE may know that the RS transmitting UE has transmitted the RS with RS transmission power related to the specific RS sequence. For example, the RS sequence and RS transmission power may be correlated as shown in Table 5.

TABLE 5

| Sequence | RS transmission power |
|---|---|
| A | X |
| B | Y |
| C | Z |

Referring to Table 5, for example, when the RS receiving UE receives the RS corresponding to the sequence B from the RS transmitting UE, the RS receiving UE may know that the RS transmission power is Y. Then, when the RS receiving UE receives the RS corresponding to the sequence A from the RS transmitting UE, the RS receiving UE may know that the RS transmission power has been changed from Y to X. For example, information on the RS transmission power may be mapped to a specific resource element. For example, when the RS is transmitted through a plurality of time-and-frequency, some resources may be multiplied by a modulated symbol. For example, it may be a method similar to RS modulation such as PUCCH format 2a/2b in LTE.

For example, in the embodiment of FIG. 12, when the RS transmission power is not changed, steps S1220 and step S1230 may be omitted.

In step S1240, the RS receiving UE may measure a sidelink channel based on the received RS. For example, the RS receiving UE may correct the measurement result according to the change in the RS transmission power. And, in step S1250, the RS receiving UE may transmit the measurement result for the sidelink channel to the RS transmitting UE.

According to an embodiment of the present disclosure, when the RS transmission power is changed, the RS transmitting UE may omit transmission of the RS. Alternatively, for example, when the RS transmission power is changed, the RS transmitting UE may inform the RS receiving UE of information on the changed RS transmission power. Accordingly, the RS receiving UE can measure the sidelink channel state more accurately.

Hereinafter, a method of changing/controlling RS transmission power according to an embodiment of the present disclosure will be described in more detail.

A PSSCH EPRE of a symbol in which the RS for measuring the sidelink channel state is transmitted may be reduced than the EPRE of other symbols. For example, when the PSCCH and the PSSCH are FDMed only in a specific symbol, the embodiment of the present disclosure may be applied. In this case, considering quadrature amplitude modulation (QAM), the receiving UE needs to know the reduced PSSCH EPRE. Therefore, the following method needs to be considered.

(1) First method: A (PSSCH) EPRE ratio may be configured between a symbol in which a RS is transmitted and a symbol in which a RS is not transmitted. For example, a PSSCH EPRE ratio may be configured between a symbol in which a RS is transmitted and a symbol in which a RS is not transmitted. The configuration related to the EPRE ratio may be pre-configured for the UE. In this case, the power configuration for the PSSCH may be limited.

(2) Second method: The RS transmitting UE may inform the RS receiving UE of a EPRE ratio between a symbol in which a RS is transmitted and a symbol in which a RS is not transmitted. For example, the RS transmitting UE may inform the RS receiving UE of the PSSCH EPRE ratio between a symbol in which a RS is transmitted and a symbol in which a RS is not transmitted. For example, the EPRE ratio may be included on the PSSCH. For example, the RS transmitting UE may transmit information on the EPRE ratio to the RS receiving UE through the PSSCH. For example, the EPRE ratio may be indicated by an RS sequence change. For example, the EPRE ratio may be indicated by an RS modulation scheme. For example, the EPRE rate may be indicated by SCI or SCI indication.

(3) Third method: The RS transmitting UE may transmit by mapping an additionally known signal to the symbol through which the RS is transmitted. For example, in order for the RS receiving UE to measure an average power in the symbol, the RS transmitting UE may transmit by mapping an additionally known signal to the symbol through which the RS is transmitted.

Alternatively, for example, the EPRE for the RS may be configured to be the same as a EPRE of a channel (e.g., PSSCH) in which the RS is embedded. In this case, a potential transient period can be avoided.

Meanwhile, in the next sidelink system, resource mapping pattern information for a demodulation reference signal (DMRS) and/or information related to DMRS mapping density may be flexibly changed through an SCI indication transmitted from a transmitting UE to a receiving UE. In addition, for example, when the transmitting UE transmits two stage SCI to the receiving UE through the PSCCH, the overhead for the second stage SCI (hereinafter, 2nd SCI) may be variable, accordingly, the amount of data and/or the coding rate that can be transmitted by the transmitting UE to the receiving UE through the PSSCH may change. The first SCI may be transmitted through the PSCCH. The second SCI may be transmitted through the PSSCH. At this time, when the understanding of the PSCCH/PSSCH transmission method is different between the sidelink CSI-RS transmitting UE and the sidelink CSI-RS receiving UE, the CSI report of a sidelink CSI-RS receiving UE and/or sidelink CSI-RS transmission CSI utilization of a sidelink CSI-RS transmitting UE may be inefficient.

Figure 13:
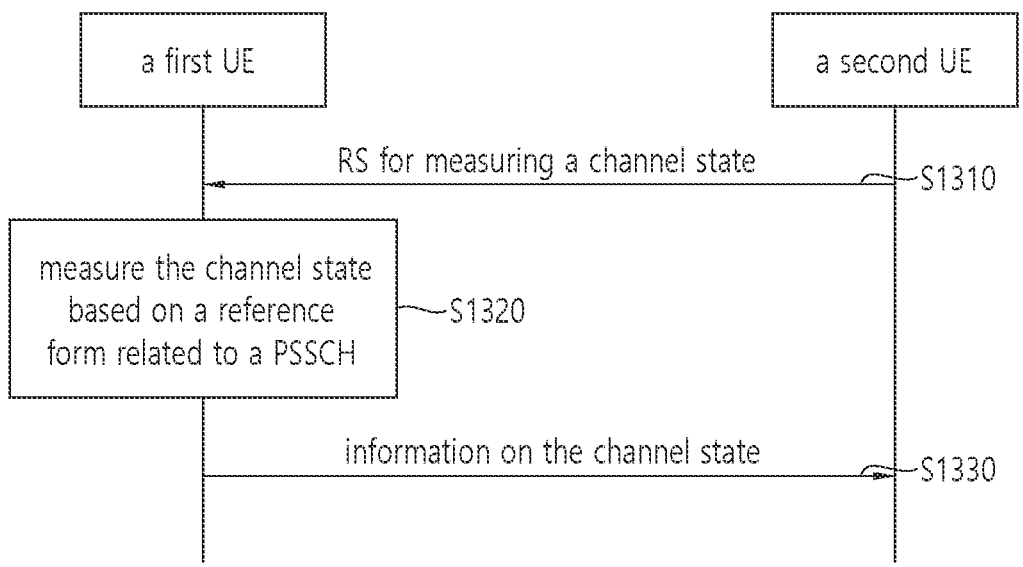
FIG. 13 shows a sidelink channel measurement procedure based on a reference form related to a PSSCH in accordance with an embodiment of the present disclosure.

FIG. 13 shows a sidelink channel measurement procedure based on a reference form related to a PSSCH in accordance with an embodiment of the present disclosure.

Referring to FIG. 13, in step S1310, the first UE may receive an RS for measuring a channel state from the second UE. For example, the first UE may receive a CSI-RS from the second UE through the PSSCH.

In step S1320, the first UE may measure the channel state based on a reference form related to a PSSCH. According to an embodiment of the present disclosure, the first UE may determine a CQI, a RI and/or a PMI based on the RS (e.g., CSI-RS) for measuring the channel state received from the second UE. In this case, for example, there may be a reference form for PSSCH transmission between the first UE and the second UE, based on this, the first UE may determine the CQI, the RI and/or the PMI, and the first UE may transmit the CQI, the RI and/or the PMI to the second UE. In this case, for example, at least one of the CQI, the RI, and/or the PMI may be included in the channel state information (e.g., CSI). For example, the reference form for PSSCH transmission may be information on a method of transmitting a PSSCH between a UE transmitting a CSI-RS and a UE receiving a CSI-RS. That is, the reference form for PSSCH transmission may be information for a reference resource related to a CSI-RS. For example, the method of transmitting the PSSCH may include the number of symbols of the PSSCH, whether the resources of the PSSCH overlap with at least one of a CSI-RS, a PT-RS and/or a Sidelink Synchronization Signal Block (S-SSB) in some areas, information related to a RV, a sequence of a DMRS related to the PSSCH, mapping form of a DMRS related to the PSSCH and/or the amount of resources for a 2nd SCI.

In addition, for example, the first UE may measure the channel state based on the reference form for PSCCH transmission. For example, the first UE may assume/determine that the number of PSCCH symbols in the reference form for the PSCCH transmission is a fixed number as a specific value in order to measure the channel state (e.g., determine CSI). For example, the number of PSCCH symbols fixed to the specific value may be the number of PSCCH symbols configured for each resource pool. Alternatively, for example, the number of PSCCH symbols fixed to the specific value may be 2 or 3.

For example, the first UE may assume/determine the number of PSSCH symbols as 12 in the reference form for the PSSCH transmission for measuring the channel state. More specifically, for example, when a normal cyclic prefix (CP) is used, the number of PSSCH symbols assumed/ determined by the first UE may be 12, and when an extended cyclic prefix (CP) is used, the number may be 10. Alternatively, for example, when a symbol on which AGC is performed is included, the number of 12 may be extended to 13, and the number of 10 may be extended to 11. That is, when the normal CP is used and a symbol for which AGC is performed is included, the number of PSSCH symbols assumed/determined by the first UE may be 13, and when the extended CP is used and a symbol for which AGC is performed is included, the number of PSSCH symbols may be 11.

For example, considering the case in which the PSFCH and the PSCCH/PSSCH are mapped in the form of mutual time division multiplexing (TDM), the number of PSSCH symbols assumed/determined by the first UE may be nine. More specifically, for example, when the normal CP is used, the number of symbols of the PSSCH assumed/determined by the first UE may be 9, and when the extended CP is used, it may be 7. Alternatively, for example, when a symbol on which AGC is performed is included, the number of 9 may be extended to 10, and the number of 7 may be extended to 8. That is, when the normal CP is used and a symbol on which AGC is performed is included, the number of PSSCH symbols assumed/determined by the first UE may be 10, and when the extended CP is used and a symbol on which AGC is performed is included, there may be eight.

For example, for each a slot including the PSFCH (that is, the slot in which the PSFCH and the PSCCH/PSSCH are mapped in a form in which mutual TDM is performed) and a slot not including the PSFCH, when the first UE selects/ determines a reference form for PSSCH transmission, a reference form for PSSCH transmission for each resource pool may be (pre-) configured to be independently or differently selected/determined. For example, the slot including the PSFCH may be a slot including the resources related to the PSFCH. Alternatively, for example, the first UE may select a different reference form for PSSCH transmission according to a mapping period of PSFCH resources. For example, when the mapping period of the PSFCH resources is 1 (e.g., when the PSFCH resources exist for each slot), the first UE may select a reference form for PSSCH transmission based on a slot including the PSFCH, and for other mapping periods of PSFCH resources, the first UE may select a reference form for PSSCH transmission based on a slot that does not include the PSFCH.

In addition, for example, a symbol length of the PSSCH may be determined based on a reference form for PSSCH transmission. For example, the symbol length of the PSSCH may be a minimum value, a maximum value, and/or an average value in a resource pool. For example, the average value of the symbol length of the PSSCH may be different according to the mapping period of the PSFCH resource. For example, the first UE may determine the symbol length of the PSSCH based on the reference form for PSSCH transmission.

Specifically, for example, when a normal CP is used, if the mapping period of the PSFCH resource is 1, the number of symbols of the PSSCH assumed/determined by the first UE may be 9 or 10. On the other hand, if the mapping period of the PSFCH resource has a value other than 1, the number of PSSCH symbols assumed/determined by the first UE may be 12 or 13.

For example, in a reference form for PSCCH/PSSCH transmission for measuring a channel state, the first UE may assume/determine that the PSSCH resources does not overlap with at least one of a sidelink CSI-RS, a sidelink PT-RS, and/or a S-SSB in some areas. For example, in a reference form for PSCCH/PSSCH transmission for measuring channel state information (CSI), the first UE may assume/determine that the PSSCH resource does not include a sidelink CSI-RS, a sidelink PT-RS, and/or a S-SSB.

For example, the redundancy version (RV) value may be variable, and the UE transmitting the PSCCH/PSSCH may transmit the changed RV value to the UE receiving the PSCCH/PSSCH through SCI. In this case, the reception performance of the PSSCH may be different according to the RV value. More specifically, when the RV value is 0, since the UE transmitting the PSCCH/PSSCH may transmit the PSSCH including a systematic bit, the decoding performance of the PSCCH/PSSCH receiving UE may be relatively superior to that of a case having different RV values. For example, in a reference form for PSCCH/PSSCH transmission for measuring a channel state, the first UE may assume/determine a specific RV value. In this case, for example, the specific RV value may be 0.

For example, in a reference form for PSCCH/PSSCH transmission for measuring a channel state, the DMRS on the PSSCH used to measure the channel state may be (pre-) configured for each resource pool and/or configured for the first UE through PC5-RRC signaling. For example, the first UE may determine a mapping form of the DMRS on the PSSCH and/or a sequence of the DMRS on the PSSCH based on the reference form for PSCCH/PSSCH transmission. For example, in a reference form for PSCCH/PSSCH transmission for measuring a channel state, the first UE may measure the channel state based on the DMRS on the PSSCH having the highest mapping density or the DMRS on the PSSCH having the lowest mapping density in the corresponding frequency-time resource.

For example, in a reference form for PSCCH/PSSCH transmission for measuring a channel state, the first UE may assume/determine that resources for the 2nd SCI do not exist. That is, the first UE may assume/determine that the amount of resources for the 2nd SCI is 0 in the reference form for the PSCCH/PSSCH transmission. For example, the 2nd SCI is transmitted on the PSSCH. In this case, for example, the PSCCH/PSSCH transmitting UE may appropriately adjust a MCS in consideration of the resource area occupied by the actual 2nd SCI and/or the amount of resources for the actual 2nd SCI. For example, the amount of resources for the 2nd SCI may be configured/determined based on the largest value or the smallest value among the values related to the amount of resources for the 2nd SCI that can be configured/indicated in a resource pool. In addition, for example, an average value for the amount of 2nd SCI resources for PSSCH resources transmitted simultaneously with a CSI-RS may be configured/determined. For example, the average value for the amount of the 2nd SCI resources may be obtained based on a scaling factor value (e.g., (3) used when setting the amount of resources for the 2nd SCI and/or the number of information bits for the 2nd SCI. For example, the first UE may determine the average value for the amount of the 2nd SCI resources based on a scaling factor value (e.g., (3) used when setting the amount of resources for the 2nd SCI and/or the number of information bits for the 2nd SCI. For example, the first UE may determine the average value for the amount of the 2nd SCI resources through a reference form for PSCCH/PSSCH transmission based on a scaling factor value (e.g., (3) used when setting the amount of resources for the 2nd SCI and/or the number of information bits for the 2nd SCI. For example, the amount of resources for the 2nd SCI determined by the first UE in the reference form for PSCCH/PSSCH transmission may be the largest value among the values related to the amount of resources for the 2nd SCI. For example, the amount of resources for the 2nd SCI may be (pre-) configured independently or differently for each resource pool.

For example, in a reference form for PSCCH/PSSCH transmission for measuring a channel state, the first UE may assume/determine that frequency domain resources for the PSSCH are frequency domain resources for a PSSCH including a CSI-RS. This may be because the CSI-RS is mapped and transmitted only within the actual PSSCH resources in the sidelink communication. Meanwhile, if the first UE measures CSI, when frequency domain resources for measuring the actual CSI is different from frequency domain resources through which the actual PSSCH is subsequently transmitted, the accuracy of the measured CSI may be lowered, and accordingly, the CSI utilization of the second UE may be inefficient. In order to prevent this situation, for example, in a reference form for PSCCH/PSSCH transmission for measuring a channel state, frequency domain resources for the PSSCH may be configured/determined as all sub-channels included in a resource pool. For example, frequency domain resources for the PSSCH may be (pre-) configured independently or differently for each resource pool, and/or configured through PC5-RRC signaling.

In step S1330, the first UE may transmit information on the channel state to the second UE. For example, the first UE may transmit the CSI to the second UE.

Additionally, for example, the first UE may select/determine information on all or part of a reference form for PSCCH/PSSCH transmission, and when the first UE perform CSI report to the second UE, the first UE may transmit the information on all or part of the reference form for the selected/determined PSCCH/PSSCH transmission together with the CSI report. Alternatively, for example, the second UE may select/determine information on all or part of a reference form for PSCCH/PSSCH transmission, and the second UE may transmit or indicate the information on all or part of the reference form for the selected/determined PSCCH/PSSCH transmission to the first UE through a SCI.

Figure 14:
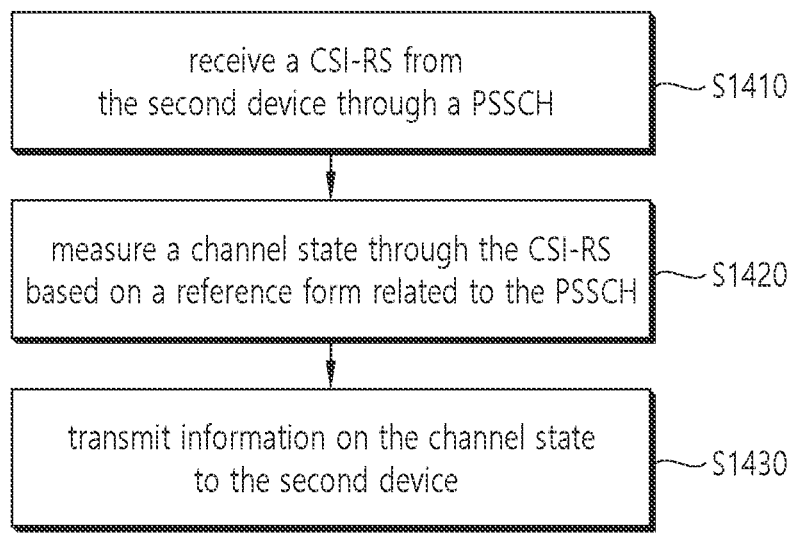
FIG. 14 shows a method for a first device to measure a sidelink channel in accordance with an embodiment of the present disclosure.

FIG. 14 shows a method for a first device to measure a sidelink channel in accordance with an embodiment of the present disclosure. The embodiment of FIG. 14 may be combined with various methods and/or procedures proposed according to various embodiments of the present disclosure.

Referring to FIG. 14, in step S1410, the first device 100 may receive a CSI-RS from the second device 200 through a PSSCH.

In step S1420, the first device 100 may measure a channel state through the CSI-RS based on a reference form related to the PSSCH. For example, a reference form related to the PSSCH may be determined based on whether a slot including resources related to the PSSCH includes resources related to a PSFCH. For example, a reference form related to the PSSCH may be determined differently based on whether a slot including resources related to the PSSCH includes resources related to a PSFCH. For example, the number of symbols of the PSSCH may be determined based on a reference form related to the PSSCH. For example, the number of symbols of the PSCCH may be determined for each resource pool. For example, the number of symbols of the PSSCH may be determined differently based on that a slot including resources related to the PSSCH includes resources related to a PSFCH. For example, a reference form related to the PSSCH may be determined based on whether a slot including resources related to the PSSCH includes a symbol for performing AGC. For example, the number of symbols of the PSSCH may be determined differently based on that a slot including resources related to the PSSCH includes a symbol for performing AGC. For example, the first device 100 may perform sidelink communication using symbols of the PSSCH determined based on the reference form related to the PSSCH.

For example, a sequence of a DMRS related to the PSSCH may be determined based on the reference form related to the PSSCH. For example, a mapping type of a DMRS related to the PSSCH may be determined based on the reference form related to the PSSCH. For example, a sequence of a DMRS related to the PSSCH and/or a mapping type of a DMRS related to the PSSCH may be determined for each resource pool. For example, the first device 100 may perform sidelink communication using a sequence of a DMRS related to the PSSCH and/or a mapping type of a DMRS related to the PSSCH determined based on the reference form related to the PSSCH.

For example, an amount of resources for a 2nd SCI may be determined based on the reference form related to the PSSCH. For example, the amount of resources for the 2nd SCI may be determined for each resource. For example, a value indicating the amount of resources for the 2nd SCI may be 0. For example, the first device 100 may perform sidelink communication using the amount of resources for the 2nd SCI related to the PSSCH determined based on the reference form related to the PSSCH.

In operation S1430, the first device 100 may transmit information on the channel state to the second device 200. For example, the information on the channel state may include CSI.

Figure 15:
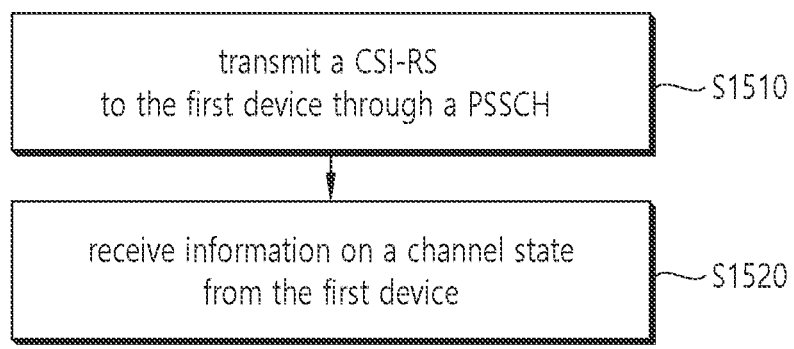
FIG. 15 shows a method for a second device to receive channel state information related to a sidelink channel from a first device in accordance with an embodiment of the present disclosure.

FIG. 15 shows a method for a second device to receive channel state information related to a sidelink channel from a first device in accordance with an embodiment of the present disclosure. The embodiment of FIG. 15 may be combined with various methods and/or procedures proposed according to various embodiments of the present disclosure.

Referring to FIG. 15, in step S1510, the second device 200 may transmit a CSI-RS to the first device 100 through a PSSCH. For example, the second device 200 may perform sidelink communication using symbols of the PSSCH determined based on a reference form related to the PSSCH. For example, the second device 200 may perform sidelink communication using a sequence of a DMRS related to the PSSCH and/or a mapping type of a DMRS related to the PSSCH determined based on a reference form related to the PSSCH. For example, the second device 200 may perform sidelink communication using an amount of resources for a 2nd SCI related to the PSSCH determined based on a reference form related to the PSSCH.

In step S1520, the second device 200 may receive information on a channel state from the first device 100. For example, the channel state may be measured through the CSI-RS based on a reference form related to the PSSCH. For example, a reference form related to the PSSCH may be determined based on whether a slot including resources related to the PSSCH includes resources related to a PSFCH. For example, a reference form related to the PSSCH may be determined differently based on whether a slot including resources related to the PSSCH includes resources related to a PSFCH. For example, the number of symbols of the PSSCH may be determined based on a reference form related to the PSSCH. For example, the number of symbols of the PSCCH may be determined for each resource pool. For example, the number of symbols of the PSSCH may be determined differently based on that a slot including resources related to the PSSCH includes resources related to a PSFCH. For example, a reference form related to the PSSCH may be determined based on whether a slot including resources related to the PSSCH includes a symbol for performing AGC. For example, the number of symbols of the PSSCH may be determined differently based on that a slot including resources related to the PSSCH includes a symbol for performing AGC.

For example, a sequence of a DMRS related to the PSSCH may be determined based on the reference form related to the PSSCH. For example, a mapping type of a DMRS related to the PSSCH may be determined based on the reference form related to the PSSCH. For example, a sequence of a DMRS related to the PSSCH and/or a mapping type of a DMRS related to the PSSCH may be determined for each resource pool.

For example, an amount of resources for a 2nd SCI may be determined based on the reference form related to the PSSCH. For example, the amount of resources for the 2nd SCI may be determined for each resource. For example, a value indicating the amount of resources for the 2nd SCI may be 0.

Since examples of the above-described proposed method may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods. A rule may be defined so that the base station informs the terminal of whether the proposed methods are applied or not (or information about the rules of the proposed methods), or the transmitting terminal informs the receiving terminal through a predefined signal (e.g., physical layer signal or higher layer signal).

Various embodiments of the present disclosure may be applied not only to vehicle-to-vehicle communication, but also to vehicle-to-pedestrian communication, vehicle-to-base station communication, or vehicle-to-fixed node communication. For example, in communication with a base station, the position and speed of the counterpart receiver may be regarded as fixed.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
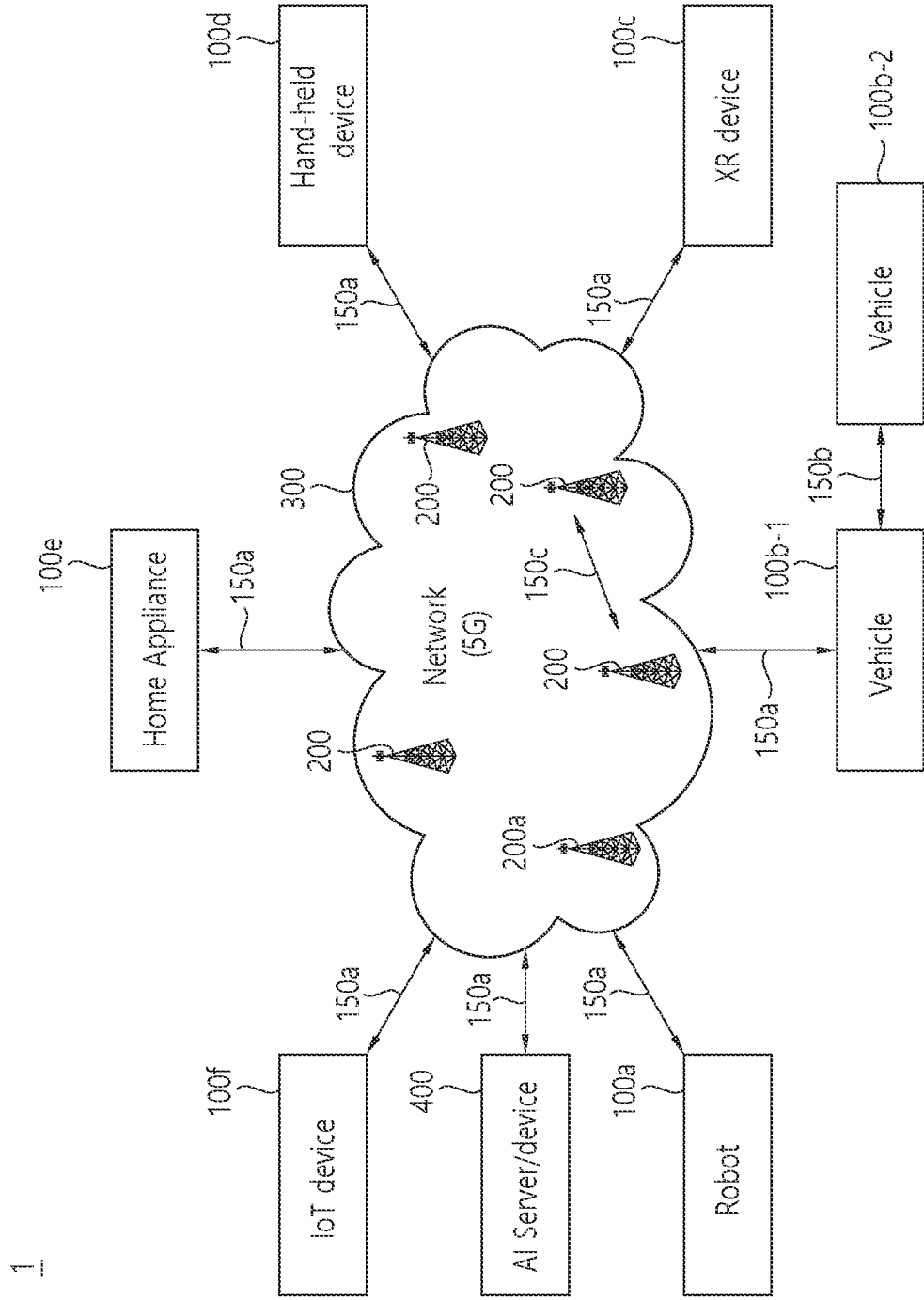
FIG. 16 shows a communication system 1, in accordance with an embodiment of the present disclosure.

FIG. 16 shows a communication system 1, in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
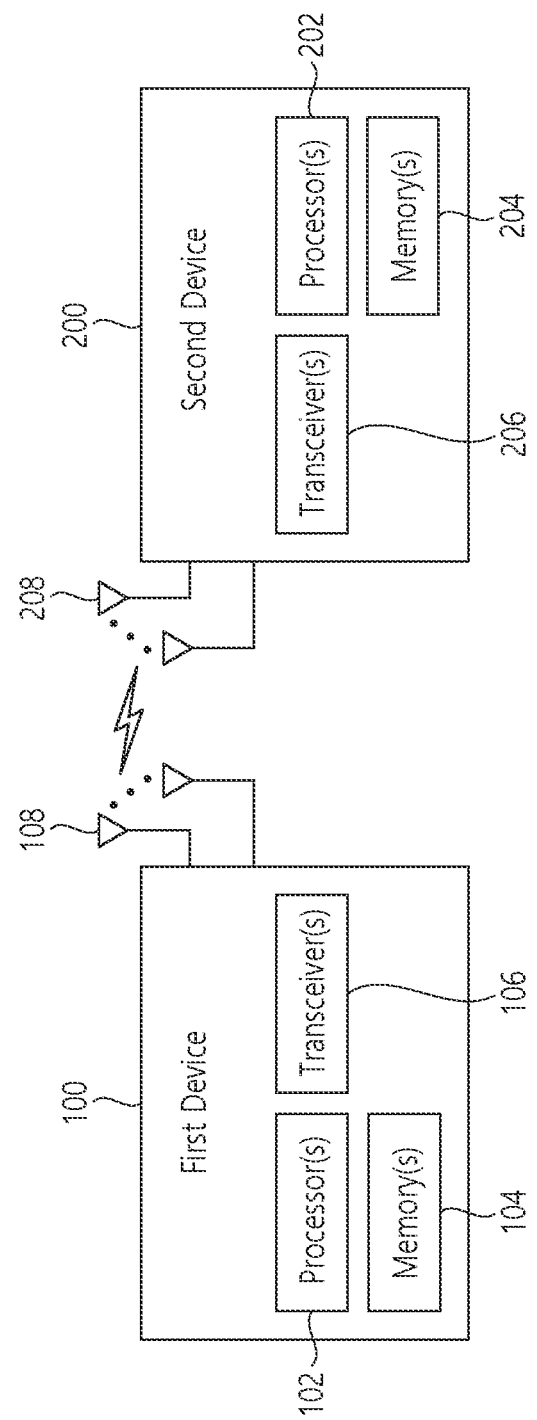
FIG. 17 shows wireless devices, in accordance with an embodiment of the present disclosure.

FIG. 17 shows wireless devices, in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
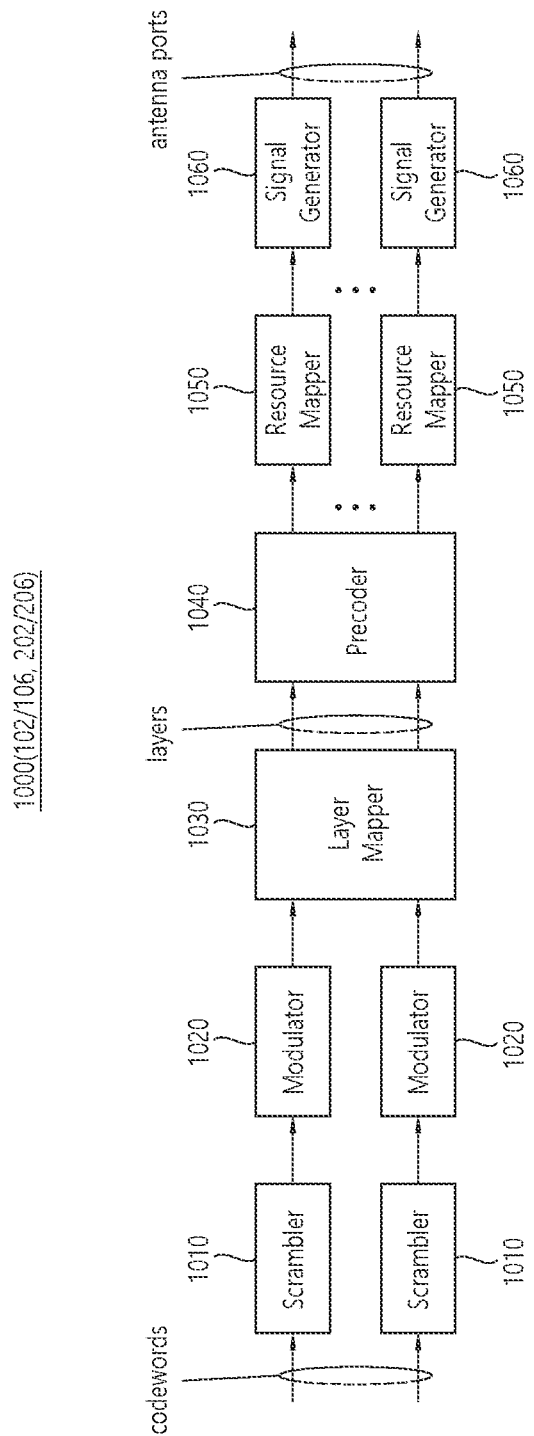
FIG. 18 shows a signal process circuit for a transmission signal, in accordance with an embodiment of the present disclosure.

FIG. 18 shows a signal process circuit for a transmission signal, in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
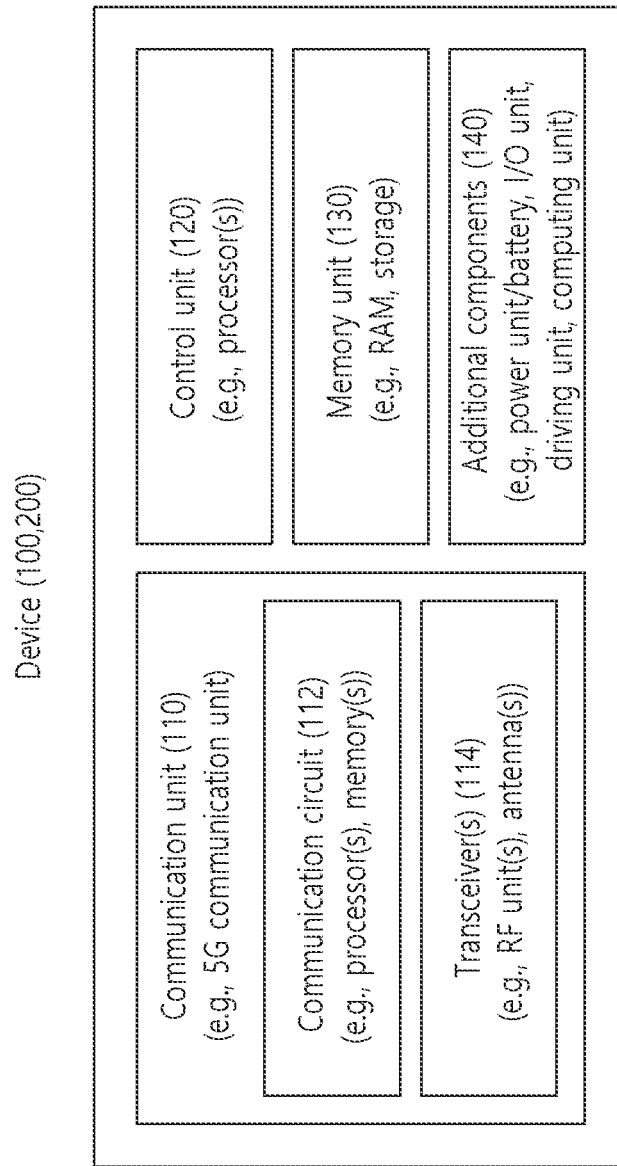
FIG. 19 shows a wireless device, in accordance with an embodiment of the present disclosure.

FIG. 19 shows another example of a wireless device, in accordance with an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
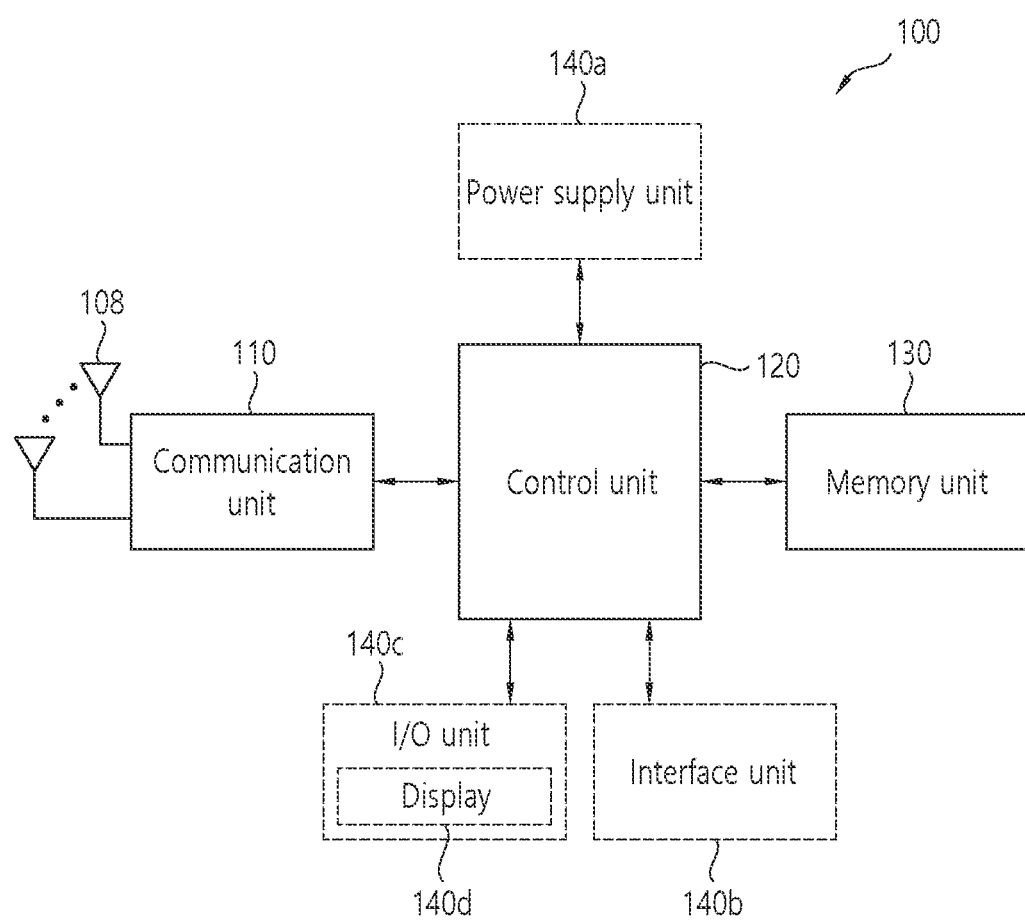
FIG. 20 shows a hand-held device, in accordance with an embodiment of the present disclosure.

FIG. 20 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
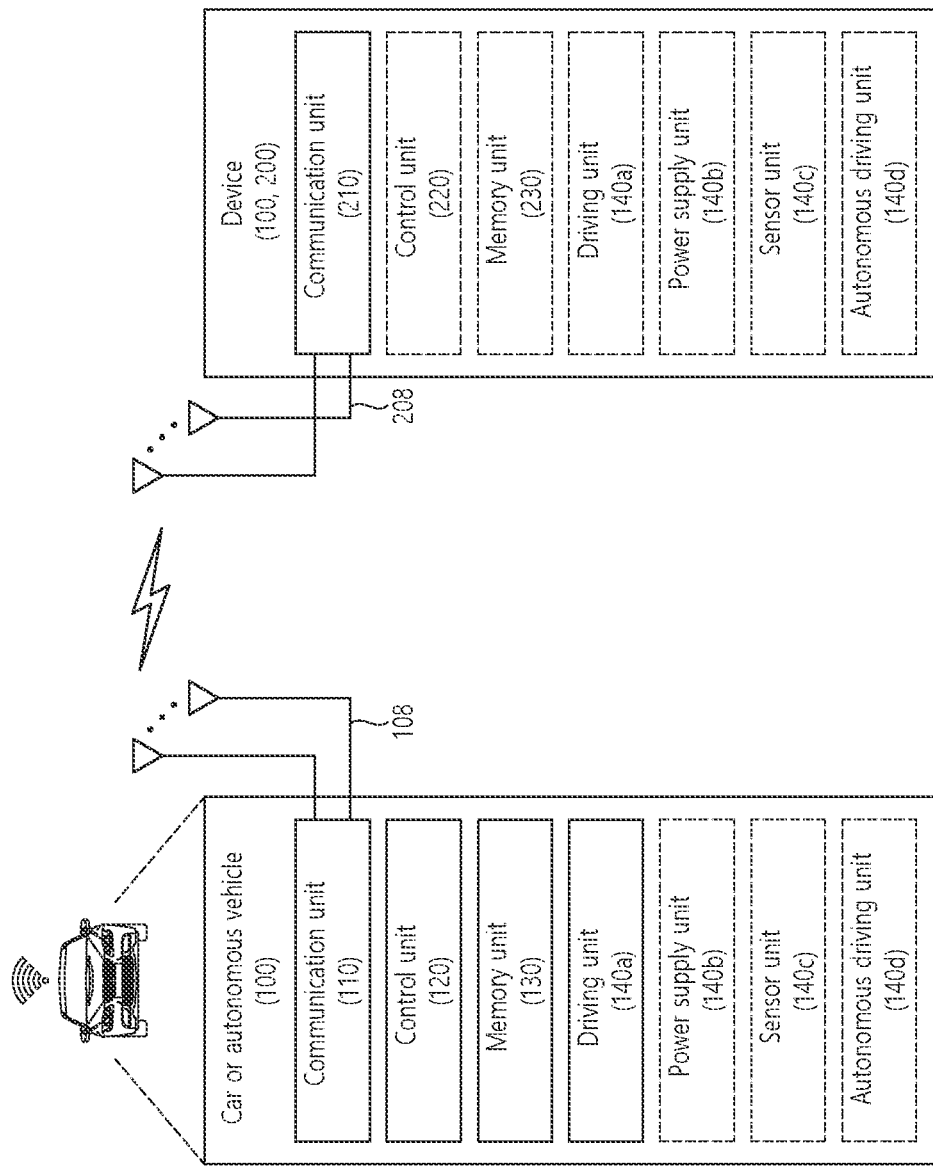
FIG. 21 shows a car or an autonomous vehicle, in accordance with an embodiment of the present disclosure.

FIG. 21 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device, the method comprising:
   receiving, from a second device, first sidelink control information (SCI) for scheduling second SCI;
   receiving, from the second device, the second SCI and a channel state information (CSI) reference signal (CSI-RS);
   deriving a channel quality indicator (CQI) and a rank indicator (RI) related to the CSI-RS, based on assuming no resources allocated to the second SCI; and
   transmitting, to the second device, CSI including based on the CQI and the RI.

2. The method of claim 1,
   wherein the CSI-RS is transmitted within a transmission of a physical sidelink shared channel (PSSCH).

3. The method of claim 2,
   wherein one or more demodulation reference signal (DMRS) patterns related to the PSSCH are configured for the first device, and
   wherein the CQI and the RI related to the CSI-RS are derived based on assuming a same number of symbols as the smallest one among the one or more DMRS patterns.

4. The method of claim 2,
wherein the transmission of the PSSCH is related to a unicast PSSCH transmission.

5. The method of claim 2,
wherein the CQI and the RI related to the CSI-RS are derived based on assuming resource element (RE) power of the CSI-RS being the same as RE power of the PSSCH.

6. The method of claim 1,
wherein a frequency domain resource of the CSI-RS includes the CSI-RS to which the CSI relates.

7. The method of claim 1, further comprising:
wherein the CQI and the RI related to the CSI-RS are derived based on assuming no resources allocated for phase tracking reference signal (PT-RS).

8. The method of claim 1, further comprising:
wherein the CQI and the RI related to the CSI-RS are derived based on assuming a redundancy version (RV) 0.

9. The method of claim 1, further comprising:
wherein the CQI and the RI related to the CSI-RS are derived based on assuming that a physical sidelink control channel (PSCCH) related to the first SCI occupies 2 symbols.

10. The method of claim 1,
wherein the CQI and the RI are derived for each resource pool.

11. The method of claim 1,
wherein the CSI-RS is a sidelink CSI-RS.

12. The method of claim 1,
wherein the CQI and the RI related to the CSI-RS are derived based on assuming no resources allocated for the CSI-RS.

13. A first device comprising:
at least one transceiver;
at least one processor; and
at least one memory connected to the at least one processor and storing instructions that, based on being executed by the at least one processor, cause the first device to perform operations comprising:
receiving, from a second device, first sidelink control information (SCI) for scheduling second SCI;
receiving, from the second device, the second SCI and a channel state information (CSI) reference signal (CSI-RS);
deriving a channel quality indicator (CQI) and a rank indicator (RI) related to the CSI-RS, based on assuming no resources allocated to the second SCI; and
transmitting, to the second device, CSI including the CQI and the RI.

14. A processing device adapted to control a first device, the processing device comprising:
at least one transceiver;
at least one processor; and
at least one memory connected to the at least one processor and storing instructions that, based on being executed by the at least one processor, cause the first device to perform operations comprising:
receiving, from a second device, first sidelink control information (SCI) for scheduling second SCI;
receiving, from the second device, the second SCI and a channel state information (CSI) reference signal (CSI-RS);
deriving a channel quality indicator (CQI) and a rank indicator (RI) related to the CSI-RS, based on assuming no resources allocated to the second SCI; and
transmitting, to the second device, CSI including the CQI and the RI.

* * * * *